United States Patent
Morganti

(10) Patent No.: US 12,551,591 B2
(45) Date of Patent: Feb. 17, 2026

(54) SANITIZATION METHOD AND RELATED SANITATION SYSTEM FOR A BEVERAGE DISPENSING SYSTEM

(71) Applicant: Celli S.p.A., Marignano RN (IT)

(72) Inventor: Mattia Morganti, Marignano RN (IT)

(73) Assignee: Celli S.p.A., Marignano RN (IT)

(*) Notice: Subject to any disclaimer, the term of this patent is extended or adjusted under 35 U.S.C. 154(b) by 670 days.

(21) Appl. No.: 18/045,750

(22) Filed: Oct. 11, 2022

(65) Prior Publication Data
US 2023/0113658 A1 Apr. 13, 2023

(30) Foreign Application Priority Data
Oct. 12, 2021 (IT) .................. 102021000026117

(51) Int. Cl.
*A61L 2/18* (2006.01)
*B67D 1/07* (2006.01)
*C25B 1/26* (2006.01)

(52) U.S. Cl.
CPC .............. *A61L 2/18* (2013.01); *A61L 2202/11* (2013.01); *A61L 2202/14* (2013.01); *B67D 2001/075* (2013.01); *C25B 1/26* (2013.01)

(58) Field of Classification Search
CPC .... A61L 2/18; A61L 2202/11; A61L 2202/14; B67D 1/07; B67D 2001/075; B67D 2210/00013; B67D 2210/00015; C25B 1/26
See application file for complete search history.

(56) References Cited

U.S. PATENT DOCUMENTS

| | | | |
|---|---|---|---|
| 6,126,797 A | 10/2000 | Sato et al. | |
| 10,457,537 B2 | 10/2019 | Hecht et al. | |
| 2002/0083842 A1* | 7/2002 | Kown | B67D 1/0044 99/290 |
| 2017/0183211 A1 | 6/2017 | Hecht et al. | |
| 2023/0069295 A1* | 3/2023 | Algül | B08B 9/0325 |

FOREIGN PATENT DOCUMENTS

| | | |
|---|---|---|
| EP | 1 024 116 A2 | 8/2000 |
| JP | H08-318280 | 12/1996 |
| WO | WO 03/010094 A1 | 2/2003 |

* cited by examiner

*Primary Examiner* — Jennifer Wecker
*Assistant Examiner* — Brady C Pilsbury
(74) *Attorney, Agent, or Firm* — Knobbe, Martens, Olson & Bear, LLP

(57) ABSTRACT

The present disclosure relates to a method for the sanitization of a beverage dispensing system comprising the following steps: feeding a vessel of an electrolytic cell with an aqueous solution; interrupting said feeding step, so that a predetermined quantity of said aqueous solution is inside said vessel; activating an electrolysis process inside said vessel, so as to transform said predetermined quantity of said aqueous solution into a quantity of sanitizing solution; and introducing said quantity of sanitizing solution into at least one duct of said beverage dispensing system.

9 Claims, 4 Drawing Sheets

SANITIZATION METHOD AND RELATED SANITATION SYSTEM FOR A BEVERAGE DISPENSING SYSTEM

CROSS-REFERENCE TO RELATED APPLICATIONS

This application claims priority to Italian Patent Application No. 102021000026117, filed on Oct. 12, 2021, the contents of which are incorporated herein by reference in its entirety.

BACKGROUND

Field

The disclosure relates to a sanitization method and related sanitation system for a beverage dispensing system, such as, for example, water, beer, wine, and/or soft drinks.

More in detail, the disclosure relates to a method for sanitizing a plant of the aforementioned type, and the relative plant, designed and realized in particular to reduce, up to potentially eliminate, the concentration of any biological agents such as, for example, bacteria or molds, which can alter the flavor of the drink dispensed, or which can be dangerous for humans.

Description of the Related Art

As is well known, beverage dispensing systems currently on the market provide one or more sources of beverages, such as water and beer, or more sources of beverage ingredients, which, when suitably mixed, form the beverage itself, such as syrups and soda, or a mix of the aforementioned sources. Depending on the beverage desired to be dispensed, the sources can be, for example, the national water network, from which it is possible to withdraw drinking water, a barrel containing, for example, beer, wine or other alcoholic or non-alcoholic beverages, or a bag in box containing syrups, and/or other additives, to be diluted in aqueous solutions such as, for example, soda.

Each source is then in fluid dynamic connection to a dispensing tap, from whose open end it is possible to let the drink out to fill a container, usually a glass, for the use of the end customer. The fluid-dynamic connection between source and tap is made by means of ducts, which are typically made of plastic, copper, steel, or a mix of these. These ducts tend to become home to mold or bacteria, due to the residues of the drink itself inside them. Such biological agents can as mentioned, modify the flavor of the beverage, which in the delivery step comes into contact with them during the passage inside the ducts of the plant itself.

An excessively high concentration of biological agents can also be dangerous for human health. Therefore, it is necessary that the beverage dispensing system periodically be sanitized, that is, it is necessary to reduce, up to the elimination, if possible, of the concentration of biological agents present inside the ducts.

The sanitizing systems of beverage dispensing systems currently on the market include a tank containing a sanitizing solution, or a chemical compound capable of strongly reducing the concentration of any biological agents such as, for example, bacteria or molds, once it comes into contact with them. This sanitizing solution is introduced into the ducts that form the system to be sanitized.

The connection point between the sanitization system and the plant to be sanitized is placed near the source of the beverage, so that the sanitization solution can act on the whole, or almost, the length of the ducts. The sanitization solution is then released from the tap or from a drainage point close to it.

After the sanitization operations, the pipes must be rinsed with plenty of water, in order to eliminate any possible residue of the sanitizing solution. Often, in fact, the chemical compounds used as sanitizing solutions can be dangerous for humans if ingested.

This procedure is difficult in terms of management of the sanitization solution. In fact, the tanks containing the sanitization solution must be periodically refilled or replaced with full tanks. It is therefore necessary for an operator to handle chemical compounds that are dangerous to humans, just as it is necessary to provide a warehouse for them.

There are also currently on the market sanitization systems for beverage dispensing systems that provide an electrolytic cell in place of the tank containing the sanitizing solution. By means of a suitable electrolytic cell, in fact, it is possible to create hypochlorous acid starting from an aqueous solution, in particular an aqueous solution containing chlorides. The hypochlorous acid thus created, in adequate concentrations, can act as a sanitization solution. The electrolytic cell is normally connected to a water source, such as, for example, a water tank or directly to the water supply. The water is made to flow inside the vessel of the electrolytic cell. By feeding the anode and the cathode of the electrolytic cell with a suitable voltage, a current passage is generated between the two electrodes through the water. In doing so, the chlorine atoms of the chlorides present in the water itself combine with the $HO^-$ ions' generating hypochlorous acid.

Hypochlorous acid has the advantage of not being dangerous for humans and, therefore, no rinsing of the ducts is required. Furthermore, in the solutions in which the cell is connected directly to the water mains, the replacement of the water tank or, alternatively, its periodic filling is not required. Furthermore, it is not necessary to handle dangerous substances, nor to provide their storage.

However, it is important that the electrolytic cell is able to generate a concentration of hypochlorous acid sufficient for the sanitization operations starting from the aqueous solution, while it flows inside the vessel.

To this end, in known systems, the aqueous solution is enriched with mineral salts. These mineral salts cause the electrolytic cell to produce a greater quantity of hypochlorous acid with the same supply voltage and flow rate of the aqueous solution inside the vessel.

In other cases, the supply voltage of the electrolytic cell is increased to ensure a sufficient hypochlorous acid concentration. Also in this case, the electrolytic cell produces a greater quantity of hypochlorous acid with the same concentration of mineral salts present in the aqueous solution and its flow rate inside the vessel.

This procedure is costly in terms of management of the aqueous solution or higher costs of designing a circuit resistant to the passage of a saline solution, if mineral salts are added, or in terms of energy consumption or heat dissipation (which increases exponentially), if a greater current is passed between the two electrodes.

Furthermore, the control and power electronics of the electrolytic cell will be all the more expensive, the more it has to operate with high voltage and current values.

SUMMARY

In light of the above, it is, therefore, the object of some embodiments of the present disclosure to provide a sanitization method for beverage dispensing systems, and the related beverage dispensing system, which requires neither management nor storage of chemicals potentially dangerous to humans.

Another object of some embodiments of the disclosure is that of carrying out a sanitization, which does not require the management or storage of mineral salts.

Still another object of some embodiments of the disclosure is to operate a low energy consumption sanitizing method.

A further object of some embodiments of the present disclosure is to provide a more economical device for carrying out sanitizing operations.

These and other results are obtained according to the disclosure with a sanitization method for a beverage dispensing system and the related beverage dispensing system.

It is, therefore, an object of some embodiments of the present disclosure method for the sanitization of a beverage dispensing system comprising the following steps: feeding a vessel of an electrolytic cell with an aqueous solution; interrupting said feeding step, so that a predetermined quantity of said aqueous solution is inside said vessel; activating an electrolysis process inside said vessel, so as to transform said predetermined quantity of said aqueous solution into a quantity of sanitizing solution; and introducing said quantity of sanitizing solution into at least one duct of said beverage dispensing system.

According to some embodiments, said activation step of the electrolysis process may have a predetermined duration equal to a first period (T-electrolysis).

According to some embodiments, said method may comprise the step of filling said at least one duct of said system dispensing of beverages with said sanitizing solution, said filling step providing for the repetition of the feeding, interrupting, activating and introducing steps for a number N of cycles.

Advantageously according to the disclosure, said method may comprise the step of letting act said sanitizing solution for a second predetermined period (T-sanitization) inside said at least one duct.

Further according to the disclosure, said method may comprise the step of emptying said at least one duct of said sanitizing solution.

According to the disclosure, said method may comprise the reiterating step, said reiterating step providing the reiterating of the filling, leaving to act and emptying steps for an M number of cycles.

According to the disclosure, said method may comprise the step of receiving from the outside at least one parameter selected from the following list of parameters: volume to be sanitized, vessel volume, predetermined quantity of aqueous solution, first period, electrolysis period, sanitizer concentration, electrolytic cell power supply current, number N of cycles, number M of cycles, second period, sanitation period, flow rate of water, type of beverage dispensed, start of the sanitation procedure, suspension of the sanitation procedure, end of the sanitation procedure, period between one sanitation procedure and the following one.

According to the disclosure, said at least one parameter may be received via an input keyboard, and/or via a remote server, and/or via a mobile device.

Advantageously according to the disclosure, said method may comprise the step of transmitting a status signal relating to the steps of said method.

According to the disclosure, said status signal may be transmitted to a remote server, and/or to a mobile device, and/or a display.

According to the disclosure, said status signal may be of the luminous, and/or acoustic, and/or vibrational, and/or textual, and/or electrical, and/or digital, and/or analog type.

According to the disclosure, said status signal indicates a start state, or an end state, or a suspension state, or an error state, or a danger state.

It is further object of some embodiments of the disclosure a beverage dispensing system comprising an electrolytic cell comprising a vessel; and a control unit connected to said electrolytic cell, wherein said system is characterized in that said control unit is configured to execute the method for the sanitization of a beverage dispensing system as defined above.

BRIEF DESCRIPTION OF THE DRAWINGS

The disclosure will be now described, for illustrative but not limitative purposes, according to its preferred embodiments, with particular reference to the figures of the enclosed drawings, wherein.

DETAILED DESCRIPTION

In the various figures similar parts will be indicated with the same numerical references.

Figure 4:
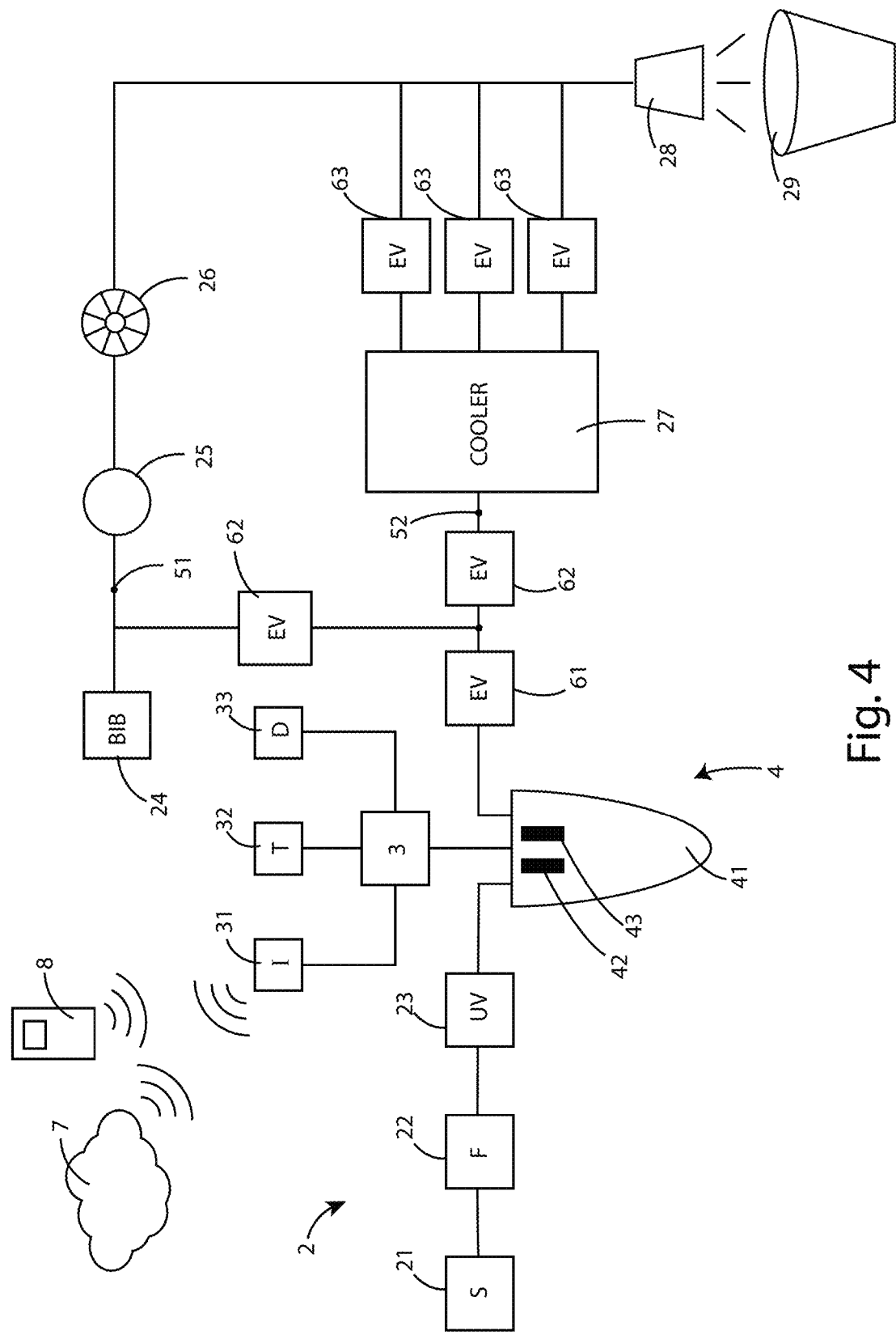
FIG. 4 shows a diagram of a beverage dispensing system made in accordance with the disclosure.

With reference to FIG. 4, a beverage dispensing system 2 is schematically shown. The plant 2 provides a source 21 of water or an aqueous solution or the like. Typically, the source 21 of water is a connection to the national water network. However, this source 21 could also be a container, or a tank containing water or an aqueous solution or the like. In the following, reference will be made to the use of a source 21 of water, in particular water drawn from the national water network, but it is clear that, for the purposes of the disclosure, it is possible to use an aqueous solution, or similar substances, including chlorides.

The water drawn from the source 21 is made to flow inside a filter 22. The presence of the filter 22 is optional. Said filter 22 has the purpose of filtering some substances dissolved in the water, for example calcium, or other minerals, making it more suitable for use as a beverage or as a base for a beverage. Furthermore, this filter 22 can be an activated carbon filter that removes the chlorine, but not the chlorides, to improve the taste of the water. These filters, based on the width of the pores, are also able to retain bacteria and other microorganisms. This effect is combined with that of a possible sanitization system located downstream.

After the filter 22, the water flowing inside the plant 2 is exposed to the radiation of an ultraviolet lamp 23. In some embodiments said ultraviolet lamp 23 is optional. Exposure to rays can occur, for example, by making water flow inside a section of a transparent duct. The ultraviolet source 23 is arranged in such a way that the light radiated by it illuminates the transparent duct section, so as to irradiate the water contained or flowing, inside the transparent duct section.

Still with reference to FIG. 4, the beverage dispensing system 2 comprises an electrolytic cell 4 arranged downstream of the ultraviolet lamp 23. In other embodiments, not shown in the figure, the electrolytic cell 4 could be arranged upstream of the ultraviolet lamp 23.

The electrolytic cell 4 comprises a vessel 41. The vessel 41 has an inlet and an outlet for the water coming from the source 21. The water from the source 21 can then enter the vessel 41 by filling it, and can come out of the vessel 41 itself. If the source 21 is the national water network, the water will be under pressure, so it is sufficient to provide a solenoid valve 61, downstream or upstream of the vessel 41, to regulate the flow of water entering and leaving the vessel 41. Otherwise, if the source 21 is a container, probably the water will not be under pressure, so it will be necessary to provide a pump (not shown in the figure) to regulate the flow of water entering and leaving the vessel 41.

Inside the vessel 41 an anode 42 and a cathode 43 are arranged, with the purpose of activating a process of electrolysis of the water contained inside the vessel 41 itself. The electrolysis process of the water, thanks to the chlorides dissolved in it, generates an acid, in particular hypochlorous acid, which can be used as a sanitizing solution to sanitize at least one duct 51, 52 of the beverage dispensing system 2.

The electrolytic cell 4 also comprises a control unit 3. The control unit 3 controls the supply voltage and/or current of the anode 42 and the cathode 43, and manages the flow of water that enters and leaves from vessel 41 by controlling the opening and closing of the solenoid valve 61, or by adjusting the flow rate of the pump (not shown in the figure).

The control unit 3 comprises an interface 31 for the exchange of data to and from a remote server 7 and/or a mobile device 8. With particular reference to FIG. 4, the connection for the exchange of data is of the wireless type, but it is clear that wired connections can also be used.

The control unit 3 also comprises an input keyboard 32 for the entry of data by an operator inside the control unit 3 itself. The keyboard 32 can be connected to the control unit 3 in a removable way, namely, it too can use a communication of the wireless type.

The control unit 3 comprises a display 33 for showing data to an operator.

Again with reference to FIG. 4, the beverage dispensing system 2 provides a first syrup duct 51. The first conduit 51 is represented by the syrup source 24, a pump 25, a flow meter 26, and a mixing nozzle 28. The first conduit 51 allows the syrup contained in the syrup source 24, typically a bag in box, to flow up to the mixing nozzle 28. In particular, the pump 25 has the purpose of pumping the syrup inside the first duct 51, while the flow meter 26 has the purpose of measuring the flow rate of the syrup inside the first duct 51 so as to regulate the pump 25 itself.

Still according to FIG. 4, the beverage dispensing system 2 provides a second water duct 52. The second duct 52 is represented by the source 21 of water, by a cooler 27, and by the mixing nozzle 28. The cooler 27, of the known type, comprises an inlet for water and three outlets, respectively for water at room temperature, fresh water, and soda, that is water with added carbon dioxide. The second duct 52 allows water at room temperature or fresh water or soda to flow up to the mixing nozzle 28. Each outlet of the cooler 27 has a solenoid valve 63 so that, by suitably controlling each solenoid valve 63, it is possible to select which of the three drinks, between water at room temperature or fresh water or soda, will flow to the mixing nozzle.

The beverage dispensing system 2 described here can therefore deliver water at room temperature, fresh water, soda, or a so-called "post-mix" beverage, i.e., a beverage made by mixing syrup and soda inside the mixing nozzle 28. However, it is quite clear that the beverage dispensing system 2 can provide other types of sources, and therefore dispensable beverages such as, for example, beer, as well as a greater number of ducts than shown in FIG. 4. Consider, for example, the presence of multiple sources of syrups, and therefore multiple syrup ducts, in order to be able to dispense different post-mix drinks.

The sanitizing solution, generated thanks to the electrolysis process of the water contained in the vessel 41, can be introduced into the first duct 51 or into the second duct 52, or into both ducts 51, 52, in order to carry out a sanitization process. The introduction of the sanitizing solution into each duct 51, 52 is controlled by means of two solenoid valves 62 placed respectively upstream of each injection point. By entry point we mean the point of the system 2 where the sanitizing solution is introduced into at least one duct 51, 52. Both solenoid valves 62 are controlled by the control unit 3.

Figure 1:
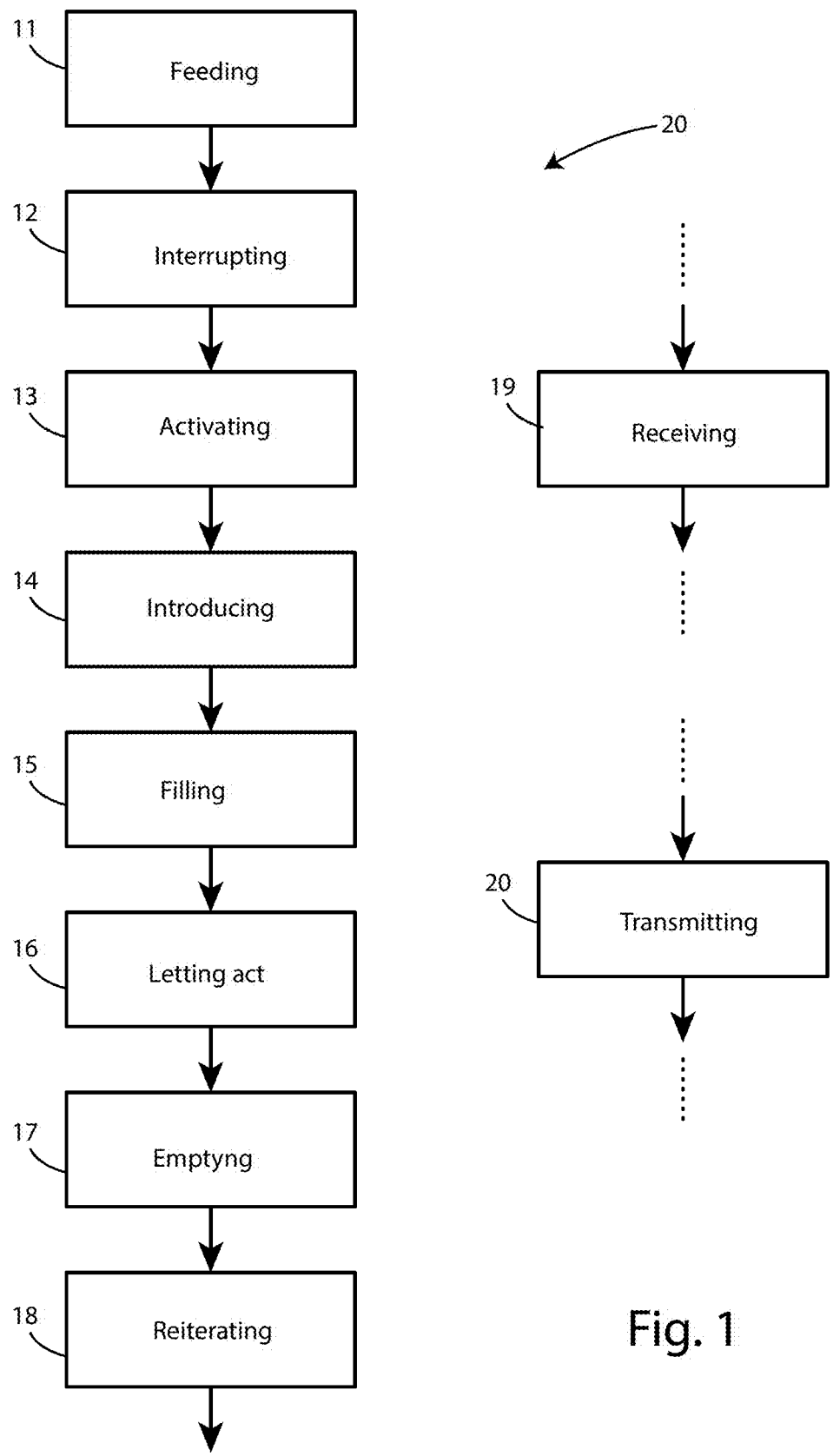
FIG. 1 shows a flow chart of a method for the sanitizing a beverage dispensing system according to the disclosure.

Referring to FIG. 1, the sanitizing method the beverage dispensing system 2 described above takes place as follows.

The control unit 3 commands the opening of the solenoid valve 61, so as to feed the vessel 41 of the electrolytic cell 4 with a predetermined quantity of water coming from the source 21. The predetermined quantity of water is a function of the volume of the vessel 41 itself, or of the amount of water that the latter can contain.

When the predetermined quantity of water is inside the vessel 41, the control unit 3 commands the closure of the solenoid valve 61 so as to interrupt the water supply to the vessel 41.

The control unit 3 activates the process of electrolysis, suitably supplying the anode 42 and the cathode 43. This process of electrolysis of the water contained inside the vessel 41, thanks to the chlorides dissolved in the water itself, will produce acid, in particular hypochlorous acid. Hypochlorous acid has a sanitizing effect, which is proportional to its concentration. The desired sanitizing effect depends, for example, on the type of duct (plastic, steel, etc.), the type of dispensed beverage (water, syrup, beer, etc.), on the use frequency of the drinks, and the sanitation frequency.

The concentration of hypochlorous acid generated by the electrolysis process is a function of the activation time of the process, of the power supply voltage of the anode 42 and of the cathode 43, and of the concentration of chlorides dissolved in the water subjected to the electrolysis process. Typically, the chlorides present in the water of the national water network are in very low concentrations (between 5 and 50 ppm). Therefore, having water withdrawn from the national water network with a low chloride content available, and wishing to supply the anode 42 and the cathode 43 of the electrolytic cell 4 with low voltages, the electrolysis process should be kept active for a first period of time (T-electrolysis) predetermined in order to obtain a desired concentration of hypochlorous acid. By appropriately choosing the first period of time (T-electrolysis) in which the electrolysis process of the water contained in the vessel 41 remains active, it is, therefore, possible to create a sanitizing method that does not require the use of chemicals or additives for water having, for example, the purpose of increasing the concentration of chlorides, nor high supply voltages of the anode 42 and cathode 43 of the electrolytic cell 4.

Once a quantity of sanitizing solution in a suitable concentration has been generated, the unit control valve 3 controls the solenoid valves 62 in order to introduce the sanitization solution into the first duct 51, or into the second duct 52, or into both ducts 51, 52, depending on whether it is desired to sanitize only one of the two ducts or both.

Figure 2:
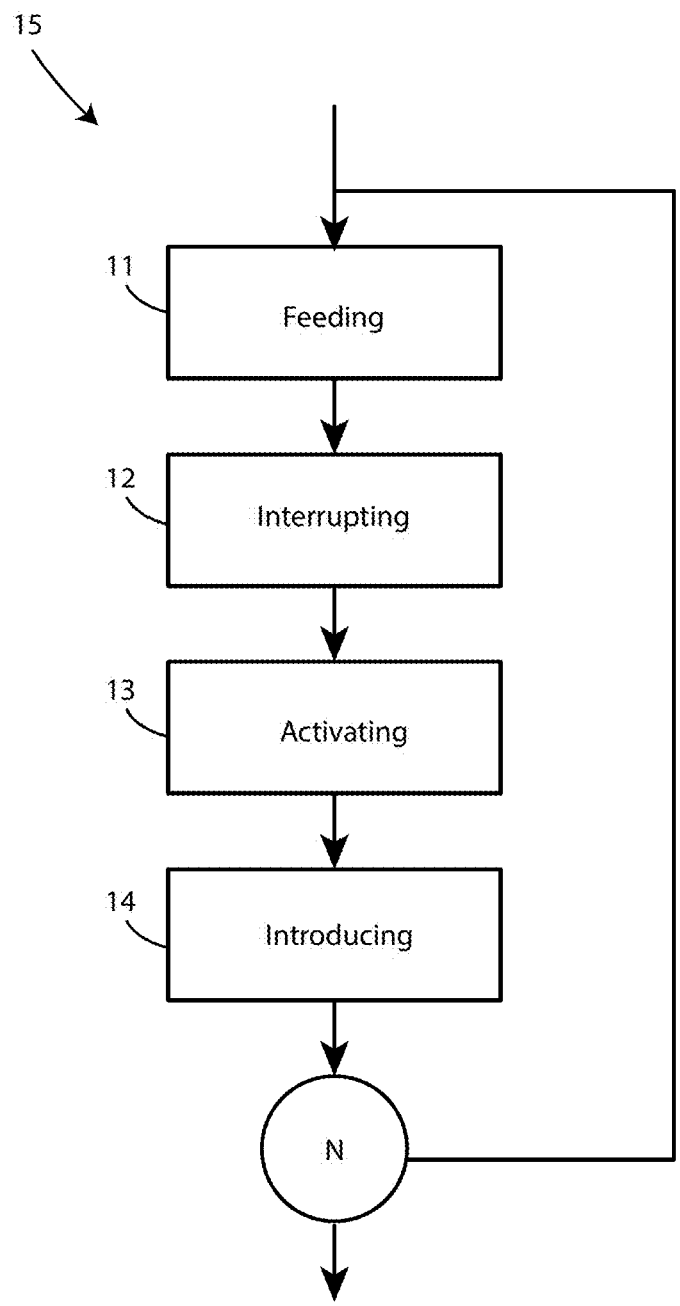
FIG. 2 shows a first detail of the flow chart of said method for sanitizing a beverage dispensing system according to the disclosure.

With reference to FIG. 2, the sanitization solution introduced will partially fill the first duct 51, or the second duct 52, or both ducts 51, 52. Therefore, in order to fill 15 the first duct 51 or the second duct 52, or both ducts 51, 52, the control unit 3 repeats the operations described so far, that is supplying 11 with water the vessel 41 of the electrolytic cell 4, interrupting 12 the power supply, activating 13 the electrolysis process and introducing 14 the sanitizing solution in at least one duct 51, 52 of the beverage dispensing system 2. The control unit 3 repeats these steps for a number N of cycles, or until the sum of the quantities of sanitizing solution introduced into the first duct 51 or into the second duct 52 or into both ducts 51, 52, at each step, does not completely fill the ducts 51, 52 themselves. The number N of cycles is calculated, taking into account the volume of the vessel 41 of the electrolytic cell 4 and the volume of the ducts 51, 52 to be sanitized.

Once the first duct 51 or the second duct 52 or both ducts 51, 52 have been filled, the sanitization solution is left acting 16 inside them for a second predetermined period of time (T-sanitization), the so-called sanitation period. The second period of time (T-sanitization) should be sufficient to guarantee the desired reduction in the concentration of any biological agents.

Once the second period of time (T-sanitization) has ended, and the sanitizing solution has performed its sanitizing function by being in contact with the internal walls of the ducts 51, 52 to be sanitized, the control unit 3 empties 17 the ducts 51, 52 themselves from the sanitizing solution, or through the mixing nozzle 28 or through a dedicated tap (not shown in the figure) placed in its vicinity.

Using hypochlorous acid, which is a substance that is not harmful to humans, it is not necessary to rinse the pipes 51, 52 of the system 2 once they have been emptied of the sanitizing solution. However, a rinsing step could be carried out (not shown in the figure) in order to ensure from the first dispensing that there is neither smell nor taste of chlorine.

Figure 3:
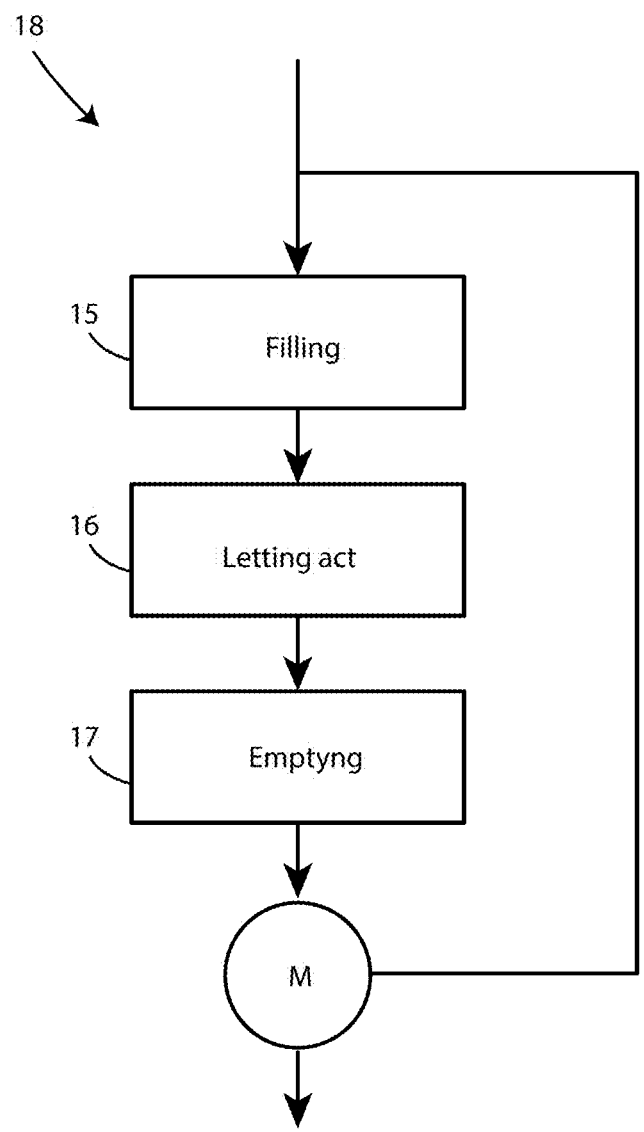
FIG. 3 shows a second detail of the flow chart of said method for sanitizing a beverage dispensing system according to the disclosure.

With reference to FIG. 3, the control unit 3 repeats 18 the steps of filling 15 the at least one duct 51, 52 with the sanitization solution, leaving 16 acting and 17 emptying the at least one duct 51, 52 from the sanitizing solution itself, for a number of M cycles. The number of cycles M is established taking into account the following effect.

As is known, the concentration of hypochlorous acid, generated through the electrolysis process, tends to decrease over time. Therefore, the sanitizing effect of the hypochlorous acid itself, when used as a sanitizing solution, is greater at the beginning of the step, in which it is left to act 16 and tends to decrease over time until it is no longer effective. Therefore, it is convenient to repeat 18 for a number M of cycles the steps of method 1 described up to now, using second shorter periods of time (T-sanitization), compared to carrying out the steps of method 1 only once with the longer second period of time (T-sanitization). The number of cycles M can be defined as a factor for reducing the second time periods (T-sanitization), namely, if method 1 is repeated for a number M of cycles, the second time periods can be reduced by a factor M (T-sanitization) than it would be necessary to perform method 1 only once.

With reference to FIG. 1, the control unit 3, through its interface 31 for data exchange, receives 19 from the remote server 7 and/or from the mobile device 8 a series of data, in particular parameters. These parameters allow adapting or optimizing, the method 1 for sanitizing a beverage dispensing system to a specific plant 2, taking into account, for example, the type of beverages dispensed by the plant 2, the volume of the ducts 51, 52 of the system 2 to be sanitized, and the frequency of use of the system 2 itself. The receiving step 19 can be performed every time the sanitizing method 1 is performed, in particular it can take place in parallel with each step of the method 1 itself.

Moreover, these parameters can also be received by the control unit 3 through the input keyboard 32, through the insertion by an operator. In this case, the receiving step 19 can advantageously take place during installation, maintenance, or modification of the plant 2, or in any case whenever an operator is near the plant 2 itself. The input keyboard 32 can be coupled in a removable way to the control unit, so that inexperienced operators cannot enter parameters in the control unit 3, in particular incorrect parameters.

The parameters received by the control unit 3 can be at least one of: volume to be sanitized, vessel volume, predetermined quantity of aqueous solution, first period, electrolysis period, concentration of the sanitizer, power supply current of the electrolytic cell, number N of cycles, number M of cycles, according to period, sanitation period, water flow rate, type of beverage dispensed, start of sanitation procedure, sanitation procedure suspension, end of sanitation procedure, period between one sanitation procedure and the next.

Again with reference to FIG. 1, the control unit 3 sends a status signal relating to the steps of method 1 to the remote server 7 and/or to the mobile device 8 and/or to the display 33. The status signal indicates, for example, a start state or an end state or a suspension state or an error state or a danger state of the sanitation method 1. In this way, the status of method 1 can be known to a remote operator, via the remote server 7 and/or the mobile device 8, as well as to an operator near the plant 2, via display 33.

It is an advantage of some embodiments of the present disclosure that of providing a sanitizing method for beverage dispensing systems, and the related beverage dispensing system, which does not require the management or storage of chemical substances potentially dangerous to humans.

Another advantage of some embodiments of the disclosure is that of carrying out sanitization that does not require the management or storage of mineral salts.

Another advantage of some embodiments of the disclosure is that of operating a sanitizing method with low energy consumption, therefore more economical and simpler to carry out.

Another advantage of some embodiments of the disclosure is to be able to adapt and/or optimize the sanitizing method to the plant to be sanitized, in particular by receiving parameters remotely or on-site.

Another advantage of some embodiments of the disclosure is to be able to adapt and/or optimize the sanitizing method for the plant to be sanitized, receiving parameters in a safe way from a qualified operator.

Another advantage of some embodiments of the disclosure is that being able to share information on the status of the sanitation process, both remotely and on-site via a display.

The disclosure has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A method for sanitizing a beverage dispensing system, the method comprising:
feeding a vessel of an electrolytic cell with an aqueous solution;
interrupting said feeding, so that a predetermined quantity of said aqueous solution is inside said vessel;
activating an electrolysis process inside said vessel, so as to transform said predetermined quantity of said aqueous solution into a quantity of sanitizing solution;
introducing said quantity of sanitizing solution into at least one duct of said beverage dispensing system;
filling said at least one duct of said beverage dispensing system with said sanitizing solution by repeating the feeding, interrupting, activating, and introducing steps for at least two cycles;
letting act said sanitizing solution for a second predetermined period (T-sanitization) inside said at least one duct;
emptying said at least one duct of said sanitizing solution; and
a reiterating step, wherein said reiterating step comprises reiterating the filling, letting act, and emptying steps for an M number of cycles.

2. The method for sanitizing a beverage dispensing system according to claim 1, wherein said activating of the electrolysis process has a predetermined duration equal to a first period (T-electrolysis).

3. The method for sanitizing a beverage dispensing system according to claim 1, further comprising receiving at least one parameter selected from a list of parameters, the list of parameters comprising: volume to be sanitized, vessel volume, predetermined quantity of aqueous solution, first period, electrolysis period, sanitizer concentration, electrolytic cell power supply current, number N of cycles, number M of cycles, second period, sanitation period, flow rate of water, type of beverage dispensed, start of sanitation procedure, suspension of the sanitation procedure, end of the sanitation procedure, and period between one sanitation procedure and the following one.

4. The method for sanitizing a beverage dispensing system according to claim 3, wherein said at least one parameter is received from at least one of an input keyboard, a remote server, or a mobile device.

5. The method for sanitizing a beverage dispensing system according to claim 1, further comprising transmitting a status signal relating to the steps of said method.

6. The method for sanitizing a beverage dispensing system according to claim 5, wherein said status signal is transmitted to at least one of a remote server, a mobile device, or display.

7. The method for sanitizing a beverage dispensing system according to claim 6, wherein said status signal is at least one of luminous, acoustic, vibrational, textual, electrical, digital, or analog.

8. The method for sanitizing a beverage dispensing system according to claim 5, wherein said status signal indicates at least one of a start state, an end state, a suspension state, an error state, or a danger state.

9. A beverage dispensing system comprising:
an electrolytic cell comprising a vessel; and
a control unit connected to said electrolytic cell,
wherein said control unit is configured to execute the method for the sanitization of a beverage dispensing system according to claim 1.

* * * * *